United States Patent
Pinheiro et al.

(10) Patent No.: US 8,787,241 B2
(45) Date of Patent: Jul. 22, 2014

(54) METHOD AND APPARATUS FOR USE IN COOPERATIVE RELAYS USING INCREMENTAL REDUNDANCY AND DISTRIBUTED SPATIAL MULTIPLEXING

(75) Inventors: Ana Lucia Pinheiro, Phoenixville, PA (US); Sana Sfar, King of Prussia, PA (US); Prabhakar R. Chitrapu, Blue Bell, PA (US); Philip J. Pietraski, Huntington Station, NY (US); Alexander Reznik, Titusville, NJ (US); Eldad M. Zeira, Huntington, NY (US); Mihaela C. Beluri, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 268 days.

(21) Appl. No.: 12/498,569

(22) Filed: Jul. 7, 2009

(65) Prior Publication Data

US 2010/0003977 A1     Jan. 7, 2010

Related U.S. Application Data

(60) Provisional application No. 61/078,658, filed on Jul. 7, 2008.

(51) Int. Cl.
| H04B 7/14 | (2006.01) |
| H04J 1/10 | (2006.01) |
| H04J 3/08 | (2006.01) |
| H04W 4/00 | (2009.01) |
| H04B 1/38 | (2006.01) |
| H04L 5/16 | (2006.01) |
| H04B 7/15 | (2006.01) |
| H04W 72/00 | (2009.01) |
| H04B 7/00 | (2006.01) |
| H04L 1/14 | (2006.01) |

(52) U.S. Cl.
USPC ........... 370/315; 370/329; 370/338; 375/219; 455/11.1; 455/73; 455/452.2; 455/509; 714/750

(58) Field of Classification Search
USPC ............ 370/329, 338; 375/219; 455/11.1, 73, 455/452.2, 509; 714/750
See application file for complete search history.

(56) References Cited

U.S. PATENT DOCUMENTS

| 2003/0079170 | A1* | 4/2003 | Stewart et al. | ................ | 714/755 |
| 2003/0135811 | A1* | 7/2003 | Xu et al. | ........................ | 714/790 |
| 2006/0209671 | A1* | 9/2006 | Khan et al. | .................... | 370/208 |
| 2007/0153758 | A1* | 7/2007 | Kang et al. | .................... | 370/338 |
| 2007/0165731 | A1* | 7/2007 | Xiao et al. | ..................... | 375/260 |

(Continued)

OTHER PUBLICATIONS

LAN/MAN Standards Committee of the IEEE Computer Society, "Part 16: Air Interface for Fixed and Mobile Broadband Wireless Access Systems," 802.16m-09/0010r1a (working document) (Mar. 2008).

(Continued)

*Primary Examiner* — Alpus H Hsu
*Assistant Examiner* — Yee Lam
(74) *Attorney, Agent, or Firm* — Volpe and Koenig, P.C.

(57) ABSTRACT

A method and apparatus are used in cooperative relays with incremental redundancy (IR) and distributed spatial multiplexing. A wireless transmit/receive unit (WTRU) may listen to the base station (BS) transmission during Phase 1 of the communication, and use cooperation between a relay station (RS) and the BS for the data transmission during Phase 2 to improve performance. During Phase 2, both the BS and the RS may transmit data to the WTRU, using either distributed Space Time Block Codes/Space Frequency Block Codes (STBC/SFBC) or distributed spatial multiplexing.

20 Claims, 9 Drawing Sheets

(56) References Cited

U.S. PATENT DOCUMENTS

| | | | |
|---|---|---|---|
| 2007/0217432 A1* | 9/2007 | Molisch et al. | 370/400 |
| 2008/0227461 A1* | 9/2008 | Dayal et al. | 455/452.2 |
| 2008/0320354 A1* | 12/2008 | Doppler et al. | 714/748 |
| 2009/0219852 A1* | 9/2009 | Youn et al. | 370/315 |
| 2009/0262678 A1* | 10/2009 | Oyman et al. | 370/315 |
| 2010/0031107 A1* | 2/2010 | Bu et al. | 714/748 |
| 2010/0111226 A1* | 5/2010 | Ko et al. | 375/299 |
| 2010/0115360 A1* | 5/2010 | Seok et al. | 714/748 |
| 2010/0303032 A1* | 12/2010 | Seo et al. | 370/329 |

OTHER PUBLICATIONS

LAN/MAN Standards Committee of the IEEE Computer Society, "Part 16: Air Interface for Broadband Wireless Access Systems," 802.16j-2009 (Amendment to IEEE Std 802.16-2009) (Jun. 2009).

Tooher et al., "Design of Collaborative Codes Achieving Space-Time Diversity," IEEE International Conference on Communications, pp. 5819-5824 (Jun. 2007).

Narasimhan et al., "Throughput-Delay Performance of Half-Duplex Hybrid-ARQ Relay Channels," IEEE International Conference on Communications, pp. 986-990 (May 2008).

Valentin et al., "Cooperative Wireless Networking Beyond Store-and Forward; Perspectives in PHY and MAC Design," Wireless Personal Communications, Kluwer Academic Publishers, pp. 49-68 (Nov. 2007).

Hoshyar et al., "Performance Evaluation of HARQ Schemes for Cooperative Regenerative Relaying," IEEE International Conference on Communications, pp. 1-6 (Jun. 2009).

* cited by examiner

US 8,787,241 B2

METHOD AND APPARATUS FOR USE IN COOPERATIVE RELAYS USING INCREMENTAL REDUNDANCY AND DISTRIBUTED SPATIAL MULTIPLEXING

CROSS REFERENCE TO RELATED APPLICATIONS

This application claims the benefit of U.S. Provisional Application Ser. No. 61/078,658 filed on Jul. 7, 2008, which is incorporated by reference as if fully set forth.

TECHNOLOGY FIELD

This application is related to wireless communications.

BACKGROUND

One of the challenges of modern cellular communication systems is the quality of the coverage at a cell edge. Wireless transmit receive units (WTRUs) located at a cell edge may experience a high amount of interference from both a base station (BS) and the WTRUs in adjacent cells. As a result of this interference, the typical average throughput measured at a cell edge may be significantly lower than the average throughput in areas close to the cell center.

To address this problem, recent research efforts have focused on cooperative communications. One way to improve the throughput at cell edge, and also extend the coverage, is to use relays. In some deployment scenarios, namely the coverage holes, the WTRU cannot receive the BS transmission. Relays configured either as repeaters or used in a simple 2-hop mode may be used to provide coverage extension. The benefit of relays extends much farther than addressing the coverage extension. When used in a cooperative fashion, relays may provide throughput enhancement for the WRTUs located at the cell edge. Various schemes for cooperation between the BS and the relay for the downlink, or between the WTRU and the relay for the uplink, have been studied in the literature. This invention defines ways to partition the information transmitted by the BS and the relay to enable IR/Chase combining based cooperation in the context of a HARQ framework.

Preliminary performance evaluation of multicast cooperation schemes assumes the use of rateless coding. However, since the framework of existing Long Term Evolution (LTE) and WiMax systems do not readily allow for the implementation of rateless coding, it would be desirable to have a method and apparatus to partition the information bits transmitted by both the RS and the BS to the WTRU during Phase 2 of the communication in order to employ hybrid automatic retransmission request/incremental redundancy (HARQ/IR) methods to approach the performance attained using rateless codes.

SUMMARY

A method and apparatus are used in cooperative relays with incremental redundancy (IR) and distributed spatial multiplexing. A wireless transmit/receive unit (WTRU) may listen to the base station (BS) transmission during Phase 1 of the communication, and use cooperation between a relay station (RS) and the BS for the data transmission during Phase 2 to improve performance. During Phase 2, both the BS and the RS may transmit data to the WTRU, using either distributed Space Time Block Codes/Space Frequency Block Codes (STBC/SFBC) or distributed spatial multiplexing.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The embodiments described herein consider the streams transmitted by the BS and RS during Phase 2. In a first embodiment, these streams may use the same information bits as Phase 1, but with a different redundancy version (RV), which allows incremental redundancy (IR) combining to be performed at the WTRU. The same information bits as in Phase 1 may be transmitted by both the BS and the RS, each using a different RV. In a second embodiment, these streams may use different subsets of Phase 1 information bits thus enabling Chase combining on the systematic bits to be performed at the WTRU. The BS and RS may transmit different information bits, each being a subset of the information transmitted in Phase 1. In a third embodiment, these streams may use different subsets of Phase 1 information bits. The BS and RS may transmit different information bits, each being a subset of the information transmitted in Phase 1.

For throughput enhancement applications, one of the best performing cooperative schemes is the "multicast cooperation". The term "multicast" is used to indicate that the WTRU is listening to the BS transmission during Phase 1, and the term "cooperation" is used to indicate that during Phase 2, both the BS and a relay station (RS) are transmitting data to the WTRU, using either distributed Space Time Block Codes/ Space Frequency Block Codes (STBC/SFBC) or distributed spatial multiplexing. For the downlink of a relay based communication systems, Phase 1 of the communication refers to the transmission of the information from the BS to the relay, while Phase 2 refers to the transmission of the information from the relay (and/or the BS) to the mobile.

The embodiments described herein may signal channel quality index (CQI) feedback between a BS and a WTRU (Feedback 1), an RS and a WTRU (Feedback 2), and a BS and an RS (Feedback 3). The scheduling of the physical (PHY) channel resources in Phase 2 may be performed by the BS, using Feedback 1, Feedback 2 and Feedback 3 to jointly optimize the throughput at the WTRU. A flexible frame structure may be used, and at least one interval per frame being used by the RS to receive the scheduling information on the downlink (DL) from the BS.

Figure 1:
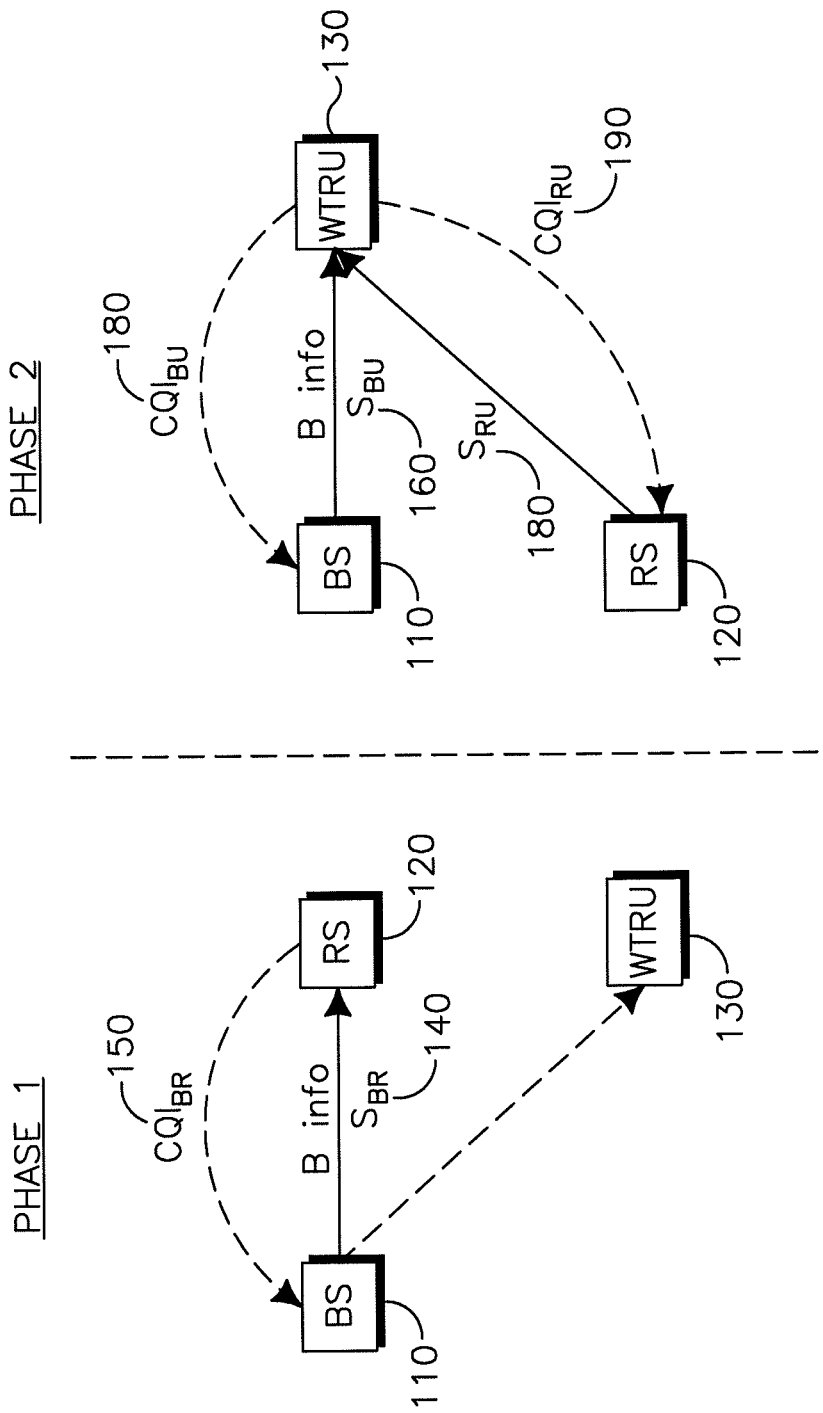
FIG. 1 is a diagram of a two-hop relay method for demodulating the symbols from two data streams in Phase 2.

FIG. 1 is a diagram of a two-hop relay method for demodulating the symbols from two data streams in Phase 2. Referring to FIG. 1, the relay system includes a BS 110, an RS 120 and a wireless transmit/receive unit (WTRU) 130. The communication between the BS 110, RS 120 and the WTRU 130 occurs in two phases, Phase 1 and Phase 2.

In Phase 1, the BS 110 sends b information bits 140 using transport format resource combination (TFRC) determined by $CQI_{BR}$ (the BS-RS link) 150. In this example, b may be an integer value. The RS 120 is assumed to correctly decode the b information bits 140. The WTRU 130 may listen to the BS 110 and place soft bits in the IR buffer (not shown for simplicity). Alternately, for the selected cooperative scheme, the TFRC may be jointly optimized based on the CQI for the BS-RS, RS-WTRU and BS-WTRU links, to maximize the throughput at the WTRU.

In Phase 2, both the BS 110 and the RS 120 use the same PHY resources, and the data is transmitted using spatial multiplexing. The information bits transmitted by the BS ($S_{BU}$) 160 and the RS ($S_{RU}$) 170 during Phase 2 may be selected according to a predetermined scheme described in more detail below. The WTRU 130 may use a minimum mean squared error-successive interference cancellation (MMSE-SIC) receiver to demodulate the symbols from the two data streams, $S_{BU}$ 160 and $S_{RU}$ 170, from the BS 110 and RS 120, respectively. In Phase 2, the WTRU 130 may send feedback $CQI_{BU}$ 180 and $CQI_{RU}$ 190 to the BS 110 and RS 120, respectively.

Figure 2:
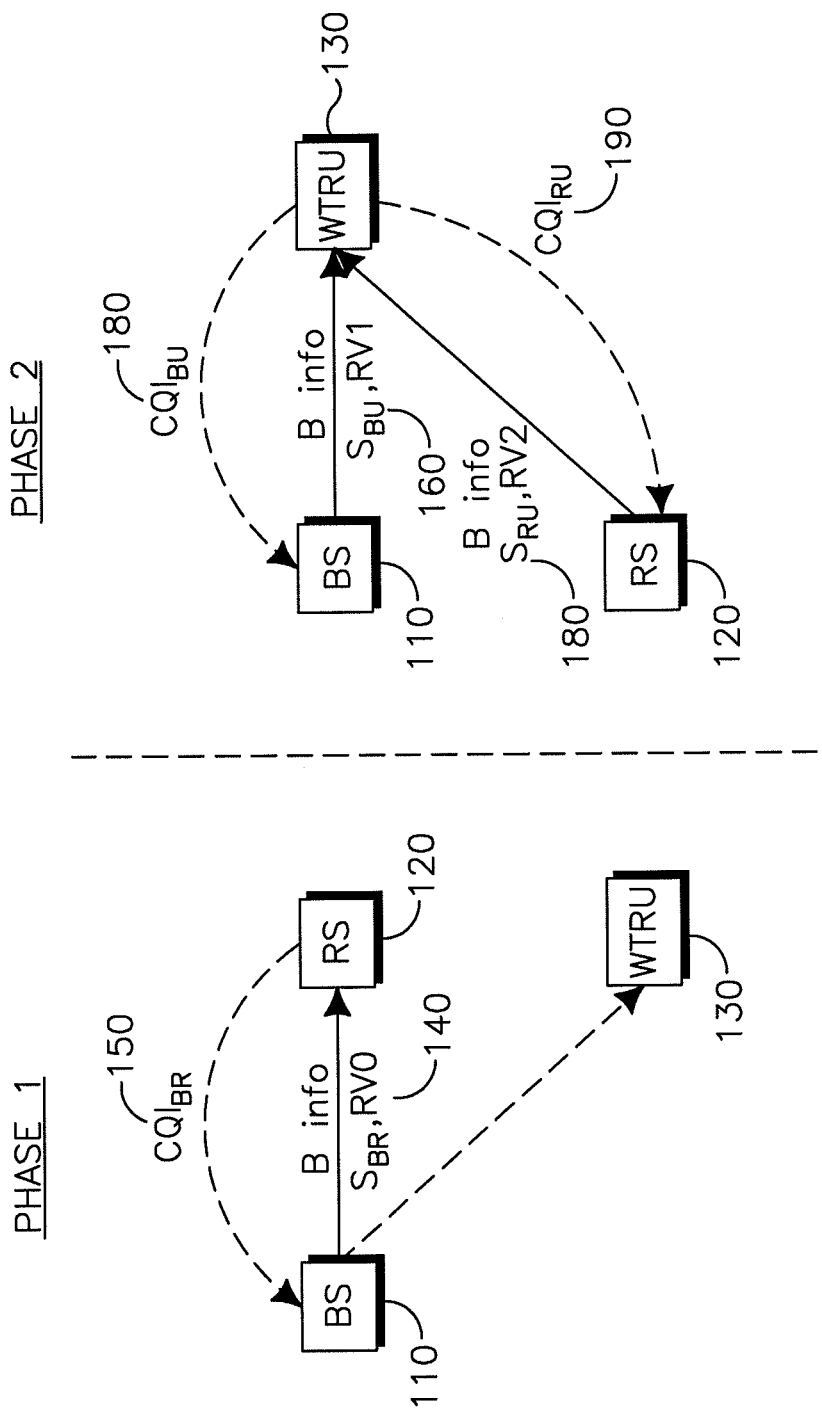
FIG. 2 a diagram of a partitioning method in Phase 2 that uses the same information bits and different RVs.

There are several possible ways to partition the information bits in Phase 2. FIG. 2 is a diagram of a partitioning method in Phase 2 that uses the same information bits and different RVs. In this scheme, the same b information bits that were transmitted by the BS 110 in Phase 1 may be retransmitted by both the BS 110 and the WTRU 130, but using different redundancy versions. The redundancy version used for the first transmission, i.e. in Phase 1, is denoted as RV(0) 140. The BS 110 may retransmit the same b information bits using a modulation and coding scheme (MCS) determined by $CQI_{BU}$ 180 and applying redundancy version RV(1) 160, while the RS 120 may transmit the same bits using redundancy version RV(2) 170. To optimize performance, several combinations may be used with respect to the RVs, for example RV(1)=RV(2) with distributed STBC/SFBC, RV(1)=RV(0), or all RVs may be different.

This method provides flexibility and allows the transmission of three different RVs by using spatial multiplexing to simultaneously transmit RV(1) and RV(2) during Phase 2. The method also enables the WTRU 130 to perform IR combining at the end of Phase 2.

Figure 3:
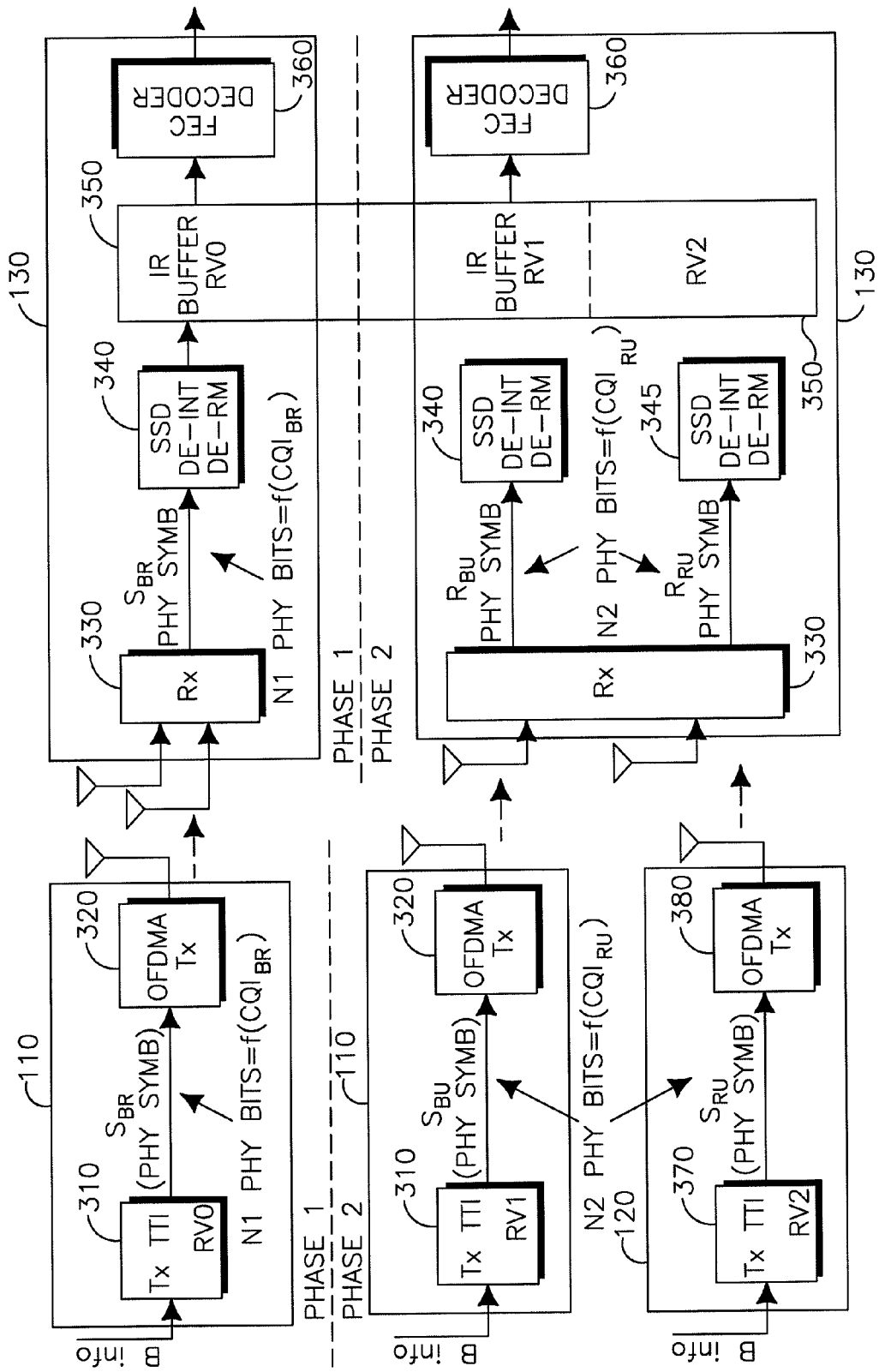
FIG. 3 is a diagram showing how IR combining may be performed at the WTRU and the end of Phase 2.

FIG. 3 is a diagram showing how IR combining may be performed at the WTRU and the end of Phase 2. Referring to FIG. 3, the BS 110 comprises a processor 310 to receive b information bits and a transmitter 320. The processor 310 assigns RV(1) to the b information bits and sends them to the transmitter 320 for transmission. The RS 120 comprises a processor 370 to receive b information bits and a transmitter 380. The processor 370 assigns RV(2) to the b information bits and sends them to the transmitter 380 for transmission. The WTRU 130 comprises a receiver 330, at least one processor 340, 345, an IR buffer 350, and an FEC decoder 360. The WTRU receives the b information bits at the receiver 330, and separates the RV(1) bits from the RV(2) bits before processing at the at least one processor 340, 345. The at least one processor 340, 345 processes the bits with different RVs and sends them to the IR buffer 350. These bits may be processed in a sequential manner by a single processor. The IR buffer 350 combines the bits with different RVs and sends them to the forward error correction (FEC) decoder 360.

For the following example, it is assumed that a cyclic redundancy check (CRC) length of 24 bits, and b=1000−24=976 information bits to be transmitted. The number of systematic bits, parity 1 and parity 2 at the output of the rate ⅓ Turbo coder is $N_{sys}$=1000; $N_{p1}$=1000; and $N_{p2}$=1000. In this example, 2000 physical channel bits are allocated for the transmission in Phase 1. The BS may transmit using an RV that prioritizes the systematic bits, thus puncturing the parity bits.

Figure 4:
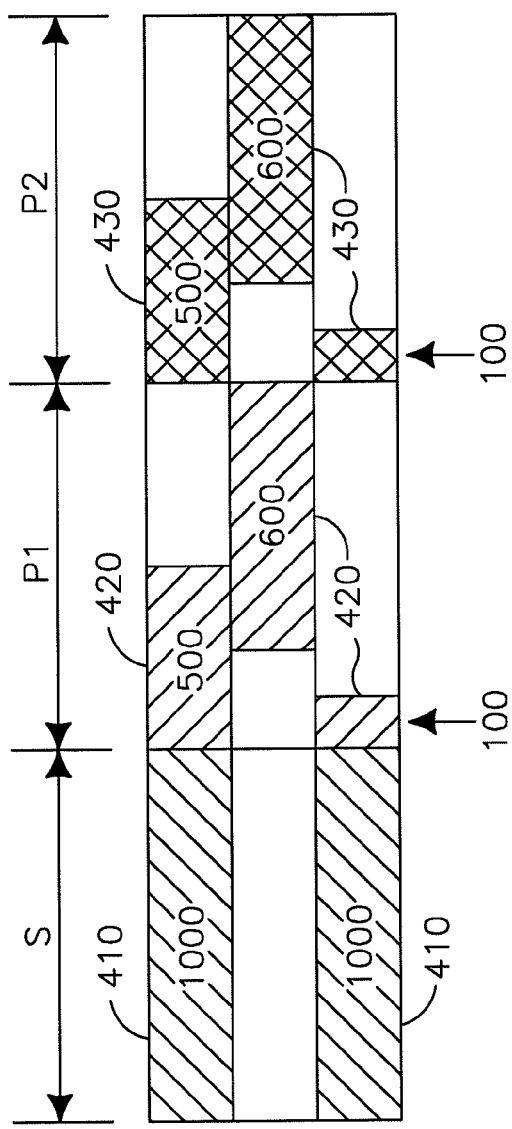
FIG. 4 is a diagram of an example relay method using the same information bits as Phase 1 with different RVs and partitioning the information bits in Phase 2.

FIG. 4 is a diagram of an example relay method using the same information bits as Phase 1 with different RVs and partitioning the information bits in Phase 2. The number of systematic 410, parity 1 420 and parity 2 bits 430 (after puncturing) transmitted by the BS is, for Phase 1 transmission is $N_{t,sys}$=1000; $N_{t,p1}$=500; and $N_{t,p2}$=500. In this example, 1200 physical channel bits are allocated by the BS for transmission in Phase 2. Both the BS and the RS may use the same resources. The BS and the RS may use different RVs to puncture the output of the Turbo coder. Referring to FIG. 4, the number of systematic 410, parity 1 420 and parity 2 bits 430 (after puncturing/rate matching) transmitted by the BS in Phase 2 is $N_{t,sys}$=0; $N_{t,p1}$=600; and $N_{t,p2}$=600, such that RV prioritizes the parity bits. The number of bits transmitted by the RS in Phase 2 is $N_{t,sys}$=1000; $N_{t,p1}$=100; and $N_{t,p2}$=100, such that RV prioritizes the systematic bits. The soft bits received by the WTRU (in Phase 1, from the BS with RV(0), in Phase 2 from the BS with RV(1), and in Phase 2 from the RS with RV(2)) are combined in the IR buffer. The combined soft bits are applied at the input of the Turbo decoder.

Figure 5:
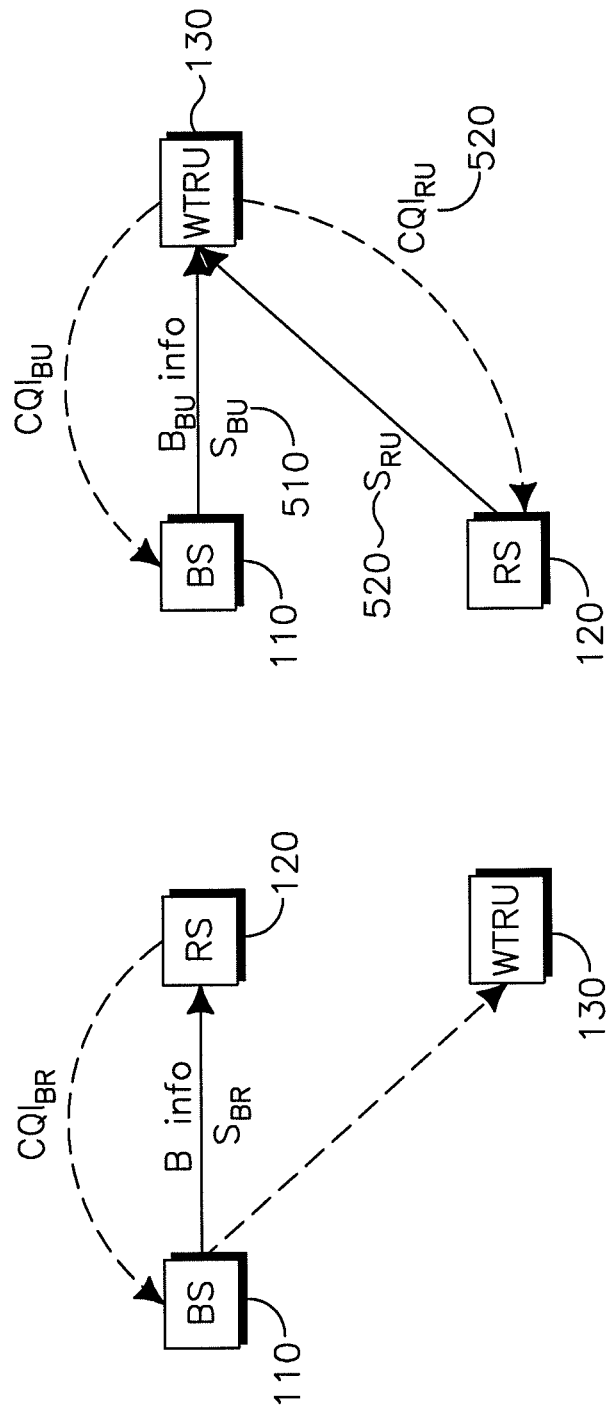
FIG. 5 is a diagram of an example relay method using different information bits in Phase 2 with Chase combining on the systematic bits.

FIG. 5 is a diagram of an example relay method using different information bits in Phase 2 with Chase combining on the systematic bits. Referring to FIG. 5, during Phase 2, the BS 110 sends $b_{BU}$ information bits 510 to the WTRU 130, which maps to the PHY resources allocated by the BS 110 for Phase 2, based on the $CQI_{RU}$ 520. The RS 120 send $b_{RU}$ information bits 520 to the WTRU 130 using the same physical resources as the BS 110 and using spatial multiplexing.

Figure 6:
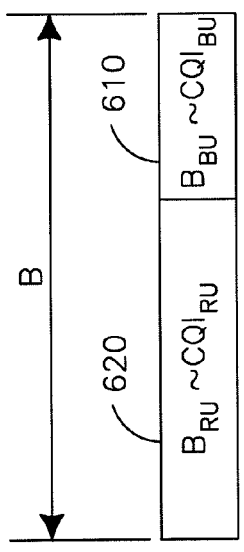
FIG. 6 is a diagram showing an example allocation of bits based on link strength.

FIG. 6 is a diagram showing an example allocation of bits based on link strength. The information bits, $b_{BU}$ 610 and $b_{RU}$ 620, are selected as subsets of the original b information bits according to a predefined algorithm known by both the BS 110 and the RS 120, such that $b_{BU}+b_{RU}$=b, and taking into account the CQI for the BS-WTRU link ($CQI_{BU}$) and the CQI for the RS-WTRU link ($CQI_{RU}$), such that it allocates more bits to the stronger link (RS-WTRU) and fewer bits to the weaker link. In addition to the link strength, the allocation of bits may be based on the available PHY resources for Phase 2 of the communication. $b_{BU}$ may be selected such that no repetition coding occurs for the BS-WTRU code block.

The method shown in FIG. 5 may result in three different code blocks being transmitted during Phase 1 and Phase 2 of the communication. For example, code block 1 (CB1) corresponding to the original b information bits may be transmitted by the BS in Phase 1, code block 2 (CB2) corresponding to the $b_{BU}$ subset of the information bits may be transmitted by the BS in Phase 2, and code block 3 (CB3) corresponding to the $b_{RU}$ sub-set of the information bits may be transmitted by the RS in Phase 2. As a result of using three different code blocks, this method allows only Chase combining on the systematic bits, which means that the redundancy bits sent in the various phases of the communication cannot be combined.

Figure 7:
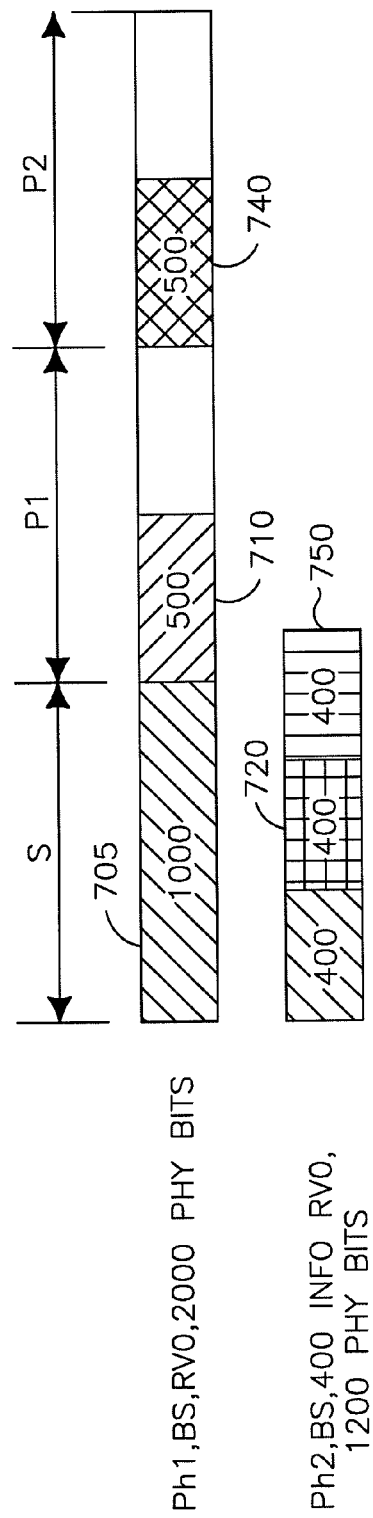
FIG. 7 is a diagram of an example relay method using three different code blocks.

FIG. 7 is a diagram of an example relay method using three different code blocks. This example uses the same assumptions as set forth in the discussion for FIG. 4. In this example, the partitioning of the information bits for the Phase 2 transmission is such that the first 600 information bits are allocated to the RS-WTRU transmission, and the last 400 information bits are allocated to the BS-WTRU transmission. In this example, 1200 physical channel bits are allocated by the BS for transmission in Phase 2.

For the BS in Phase 2, the number of systematic 705, parity 1 710 and parity 2 bits 740 before and after rate matching are 400 systematic bits. Before rate matching, $N_{sys}=400$; $N_{p1}=400$; and $N_{p2}=400$ are transmitted. After rate matching, $N_{t,sys}=400$; $N_{t,p1}=400$; and $N_{t,p2}=400$ are transmitted such that no puncturing occurs.

The number of bits transmitted by the RS in Phase 2 is 600 systematic bits. Before rate matching, $N_{sys}=600$; $N_{p1}=600$; and $N_{p2}=600$ are transmitted. After rate matching, $N_{t,sys}=600$; $N_{t,p1}=300$; and $N_{t,p2}=300$ are transmitted such that RV prioritizes the systematic bits. The soft bits received by the WTRU corresponding to the three different code blocks (CBs) are shown in FIG. 7 as CB1, p1 710, CB2, p1 720, CB3, p1 730, CB1, p2 740, CB2, p2 750, and CB3, p2 760.

The effective coding rates for the example shown in FIG. 7 are R1=0.5 for the transmission of CB1 from the BS in Phase 1. This coding rate is matched to the channel conditions for the BS-RS link, and may be too high to allow correct decoding at the WTRU. R2=0.33 for the transmission of CB2 on the BS-WTRU link in Phase 2, and R3=0.5 for the transmission of CB3 on the RS-WTRU link in Phase 2. Since fewer information bits may be assigned to the weaker link (BS-WTRU) in Phase 2 while using the same number of PHY resources as for the stronger link (RS-WTRU), the coding rate may be low, which may result in successful decoding of that code block, assuming that a stand-alone CRC is attached to that code block. One drawback of this method is that it allows only Chase combining to be performed on the systematic bits.

Figure 8:
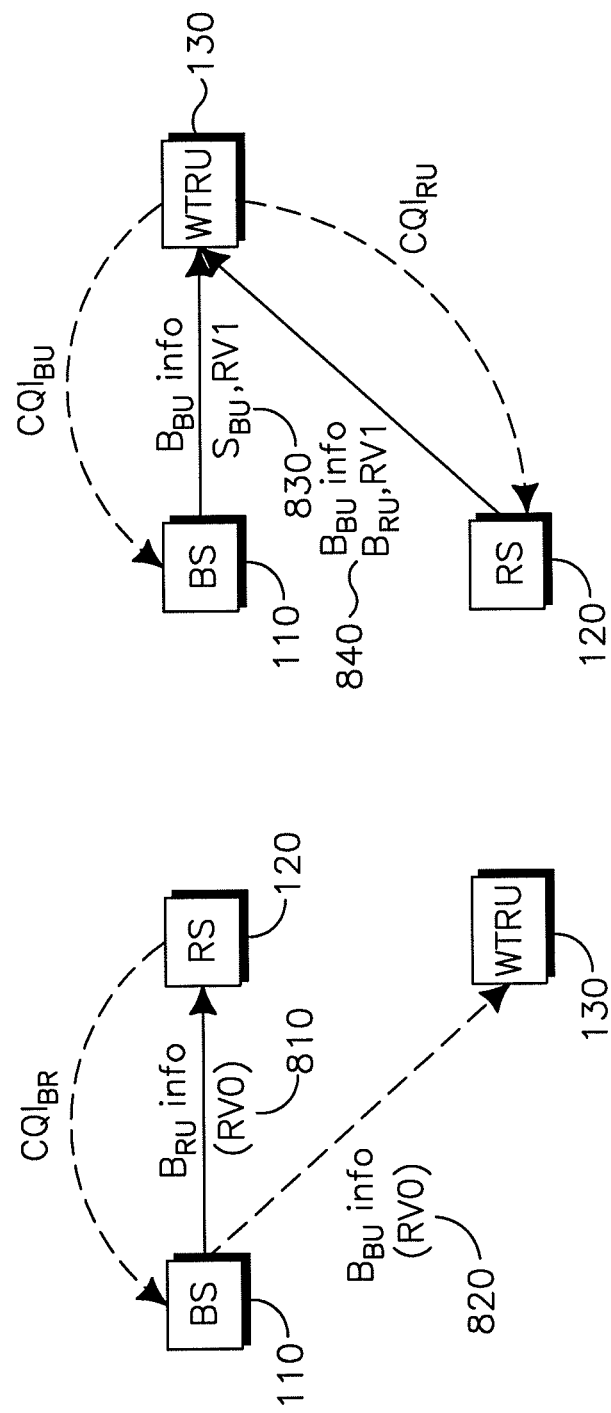
FIG. 8 is a diagram of a relay method that uses different subsets of Phase 1 information bits and IR combining.

FIG. 8 is a diagram of a relay method that uses different subsets of Phase 1 information bits and IR combining. To avoid the limitation of allowing only Chase combining, the original b information bits may be partitioned into two subsets during Phase 1, instead of waiting to partition the bits in Phase 2. If the original b information bits are partitioned into $b_{BU}$ 810 and $b_{RU}$ bits 820 in Phase 1, two code blocks may be transmitted by the BS 110 in Phase 1. For example, both code blocks may be concatenated in the same TTI using RV(0). A CRC may be attached to each subset of bits.

During Phase 2, the BS 110 may send $b_{BU}$ information bits 830 to the WTRU 130 using the PHY resources allocated for Phase 2 (RS-WTRU link), and may employ a different RV. Similarly, the RS 120 may send $b_{RU}$ information bits 840 to the WTRU 130 using the same PHY resources as the BS 110 and employ a different RV from the one used in Phase 1. This method may enable IR combining on each of the code blocks corresponding to the $b_{BU}$ 830 and $b_{RU}$ bits 840. In this example, the $b_{BU}$ 810 and $b_{RU}$ bits 820 of Phase 1 are the same as the $b_{BU}$ 830 and $b_{RU}$ 840 bits in Phase 2.

Figure 9:
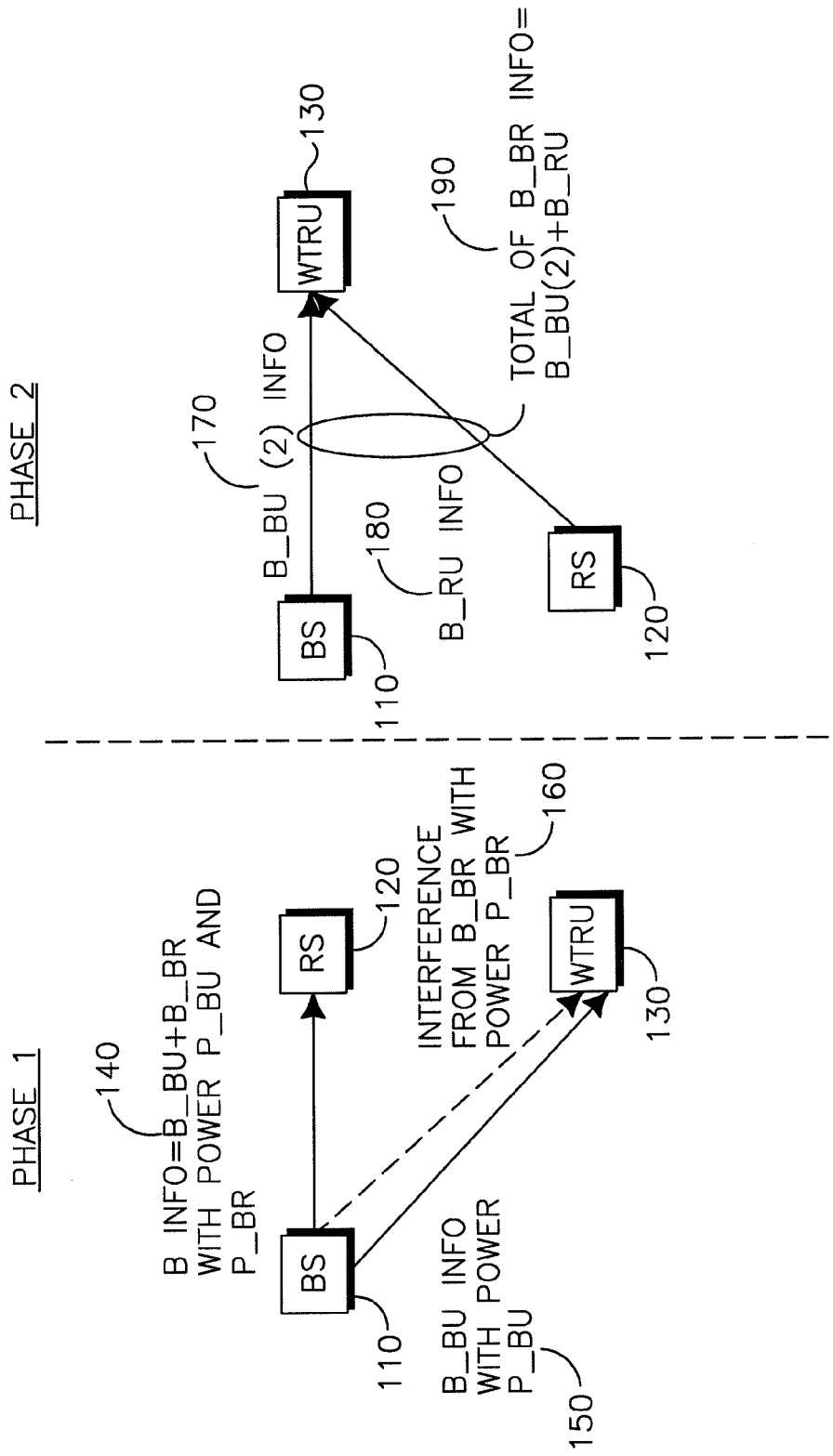
FIG. 9 is a diagram of a relay method that uses hierarchical coding/modulation.

FIG. 9 is a diagram of a relay method that uses hierarchical coding/modulation. With hierarchical modulation, the data may be encoded in two (2) layers. The first layer may be encoded with the weakest link rate and the second layer may be encoded for higher rates. For example, assume 4QAM and 16QAM modulations. In this example, each layer will need two (2) and four (4) bits per symbol, respectively, to map the information bits to encoded symbols. Since the 4QAM symbol may be embedded in the 16QAM symbol, only one symbol is sent at a time and the WTRU with the weaker link will use only the first 2 bits of the received 16QAM symbol to decode only a part of the information bits. The remaining two (2) other bits may be referred to as enhancement bits. In that case, the WTRU with the stronger link will decode the full codeword. The weaker WTRU may experience interference from the enhancement bits.

Referring to FIG. 9, in Phase 1, the BS 110 sends b information bits 140 to the RS 120, where the b information bits 140 is equal to B_BU plus B_BR with a power of P_BU and P_BR. The BS 110 also sends B_BU information bits 150 to the WTRU 130 with a power of P_BU. The WTRU 130 may receive interference 160 from B_BR with a power of P_BR. In Phase 2, the BS 110 sends B_BU(2) information bits 170 to the WTRU 130, while the RS 120 sends B_RU information bits 180 to the WTRU 130. The total number of B_BR information bits 190 received at the WTRU 130 is equal to B_BU (2) plus B_RU.

Figure 10:
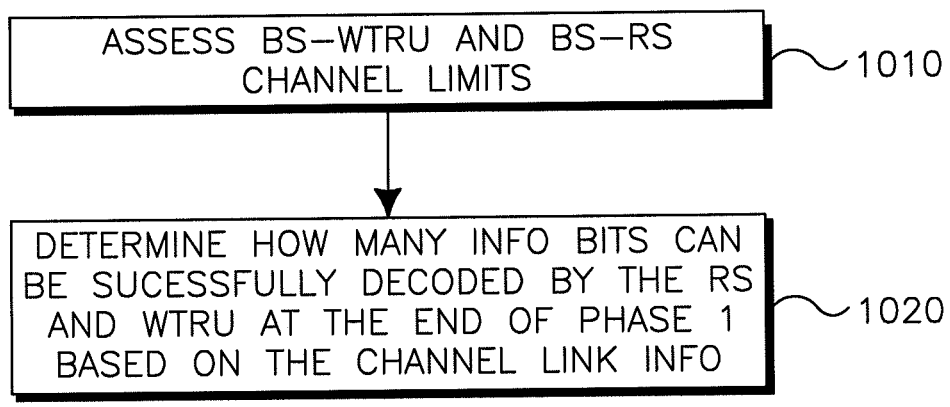
FIG. 10 is a flow diagram of a method applied at the downlink of cellular relays.

FIG. 10 is a flow diagram of a method 1000 applied at the downlink of cellular relays. If this method is applied at the downlink of cellular relays, the BS may assess the BS-WTRU and BS-RS channel links 1010. The BS may then use the channel link information to determine 1020 how many information bits may be successfully decoded by the RS and the WTRU at the end of Phase 1.

For the following example, let b and $b_{UE}$ denote the information bits, where $b_{UE}$ is a subset of b, and let p be the total transmitted power by the BS and let βP be the fraction of power used to transmit the $b_{UE}$ bits while embedded in the b information bits. Under the assumption that RSs are mounted at a height of 15 meters and enjoy a line of sight (LOS) condition to the BS, the BS to RS link may be stronger than the BS to WTRU link. The RS may be able to decode the full b information bits with a rate determined by the equation:

$$R_{BS-RS} = \log\left(1 + \frac{P \times g_{BS-RS}^2}{N_0}\right) \quad \text{(Equation 1)}$$

While the WTRU may experience interference from the enhancement bits, the WTRU rate is given by the equation:

$$R_{BS-UE} = \log\left(1 + \frac{\beta P \times g_{BS-UE}^2}{N_0 + (1-\beta)P \times g_{BS-UE}^2}\right) \quad \text{(Equation 2)}$$

In phase 2, the BS and RS may adopt any type of cooperative schemes, such as forwarding, cooperative diversity or multiplexing, for example, to forward the $b_{RS}$ bits to the WTRU. The rate achieved by the WTRU in Phase 2 may be denoted by $R_U(2)$.

Assuming that a transmission is achieved such that each codeword is received correctly and the channel conditions did not change throughout the communications, the effective throughput seen at the WTRU may be determined by the equation:

$$R_{\mathit{eff}-UE}(Hierar) = \frac{b}{T_1 + T_2} \quad \text{(Equation 3)}$$

$$= \frac{1}{\frac{1}{R_{BS-RS}} + \frac{1}{R_U(2)}\left(1 - \frac{R_{BS-UE}}{R_{BS-RS}}\right)}$$

where $R_{BS-RS}$ and $R_{BS-UE}$ are given above.

Comparing the hierarchical method with the rateless method, both have the same effective throughput formulae but with the difference that $R_{BS-UE}$ is given by $$\log\left(1 + \frac{\beta P \times g_{BS-UE}^2}{N_0 + (1-\beta)P \times g_{BS-UE}^2}\right)$$

in the hierarchical scheme and by $$\log\left(1 + \frac{P \times g_{BS-UE}^2}{N_0}\right)$$

in the rateless scheme.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a receiver configured to receive, following a first phase transmission, a plurality of transmissions in a second phase, wherein each of the plurality of transmissions in the second phase are received from a base station (BS) over a BS link and a relay station (RS) over an RS link, wherein each of the plurality of transmissions in the second phase contains a subset of bits transmitted in the first phase transmission and contains a plurality of bits coded with different redundancy versions (RVs),
wherein during the second phase transmissions, a first portion of the plurality of bits is received over the BS link and a second portion of the plurality of bits is received over the RS link,
wherein the RS link is allocated a greater proportion of the plurality of bits on a condition that a link Quality of the RS link is stronger than a link Quality of the BS link, and
wherein the BS link is allocated a greater proportion of the plurality of bits on a condition that the link quality of the BS link is stronger than the link quality of the RS link;
a processor configured to process the plurality of bits;
a buffer configured to combine the plurality of bits based on a link quality between the BS and the RS in the first phase transmission;
a decoder configured to decode the combined plurality of bits; and
a transmitter configured to transmit, in the second phase, a first channel quality index (CQI) feedback to the BS and a second CQI feedback to the RS.

2. The WTRU of claim 1, wherein the receiver is configured to receive the first phase transmission from the BS.

3. The WTRU of claim 2, wherein the receiver is configured to receive the first phase transmission coded with a first redundancy version (RV) and the plurality of transmissions in the second phase coded with a second and third RV.

4. The WTRU of claim 1 wherein the transmitter is further configured to transmit the first CQI feedback based on a channel quality between the BS and the WTRU, and transmit the second CQI feedback based on a channel quality between the RS and the WTRU.

5. The WTRU of claim 3, wherein the receiver is configured to separate the bits based on the RV.

6. The WTRU of claim 1, wherein the receiver is configured to receive the bits in the second phase that are partitioned into systematic bits and a plurality of parity bits.

7. The WTRU of claim 6, wherein the receiver is configured to receive the plurality of parity bits that is assigned a higher priority based on a RV.

8. The WTRU of claim 6, wherein the receiver is configured to receive the systematic bits that are assigned a higher priority based on a RV.

9. The WTRU of claim 1, wherein each of the plurality of transmissions in the second phase contains a bit coded with a subset of information in the first phase transmission.

10. A wireless communications method for a wireless transmit/receive unit (WTRU) comprising:
receiving, following a first phase transmission, a plurality of transmissions in a second phase, wherein each of the plurality of transmissions in the second phase are received from a base station (BS) over a BS link and a relay station (RS) over an RS link,
wherein each of the plurality of transmissions in the second phase contains a subset of bits transmitted in the first phase transmission and contains a plurality of bits coded with different redundancy versions (RVs), wherein during the second phase transmissions, a first portion of the plurality of bits is received over the BS link and a second portion of the plurality of bits is received over the RS link, wherein the RS link is allocated a greater proportion of the plurality of bits on a condition that a link quality of the RS link is stronger than a link quality of the BS link, and wherein the BS link is allocated a greater proportion of the plurality of bits on a condition that the link quality of the BS link is stronger than the link quality of the RS link;

processing the plurality of bits;

combining the plurality of bits based on a link quality between the BS and the RS in the first phase transmission;

decoding the combined plurality of bits; and transmitting, in the second phase, a first channel quality index (CQI) feedback to the BS and a second CQI feedback to the BS.

11. The method of claim 10, wherein the first phase transmission is received from the BS.

12. The method of claim 11, wherein the first phase transmission is coded with a first redundancy version (RV) and the plurality of transmissions in the second phase is coded with a second and third RV.

13. The method of claim 12, wherein the first RV is equal to the second RV.

14. The method of claim 12, wherein the second RV is equal to the third RV with distributed space time block coding (STBC) or space frequency block coding (SFBC) modulation.

15. The method of claim 10 wherein the first CQI feedback is transmitted based on a channel quality between the BS and the WTRU, and the second CQI feedback is transmitted based on a channel quality between the RS and the WTRU.

16. The method of claim 12, wherein the receiving includes separating the plurality of bits based on a RV.

17. The method of claim 10, wherein the plurality of bits received in the second phase are partitioned into systematic bits and a plurality of parity bits.

18. The method of claim 17, wherein the plurality of parity bits is assigned a higher priority based on a RV.

19. The method of claim 17, wherein the systematic bits are assigned a higher priority based on a RV.

20. The method of claim 10, wherein each of the plurality of transmissions in the second phase contains a bit coded with a subset of information in the first phase transmission.

* * * * *